United States Patent [19]

Yoshida et al.

[11] 4,355,329

[45] Oct. 19, 1982

[54] REMOTE STATION

[75] Inventors: Shinichi Yoshida, Hino; Kazutaka Kobayashi, Kokubunji, both of Japan

[73] Assignee: Nipon Interphone Co., Ltd., Japan

[21] Appl. No.: 250,052

[22] Filed: Apr. 1, 1981

[30] Foreign Application Priority Data

Apr. 14, 1980 [JP] Japan ............................ 55-50513[U]

[51] Int. Cl.³ .......................... H04N 7/18; H04N 5/26
[52] U.S. Cl. ................................ 358/108; 179/2 TV; 358/85
[58] Field of Search ................. 358/85, 225, 229, 108; 179/2 TV

[56] References Cited

U.S. PATENT DOCUMENTS

| | | | |
|---|---|---|---|
| 3,482,037 | 12/1969 | Brown | 358/108 |
| 3,564,132 | 2/1971 | Baker | 358/108 |
| 3,567,848 | 3/1971 | Thies | 358/85 |
| 3,891,795 | 6/1975 | Johnson | 358/225 |
| 4,258,387 | 3/1981 | Lemelson | 358/85 |

Primary Examiner—Howard Britton

[57] ABSTRACT

A remote station provided with a television camera and coupled to master station of an inter communication system is disclosed. The housing of the remote station includes at a least front panel and a window is formed through the front panel at its upper portion. An adaptor lens is engaged with the window for introducing the light from an object to be picked up at a wide angle into the housing and a pick-up tube of a television camera is disposed within the housing. A reflector is disposed within the housing between the adaptor lens and the pick-up tube so as to reflect the light from the object thereon and project thus reflected light on the pick-up tube.

5 Claims, 5 Drawing Figures

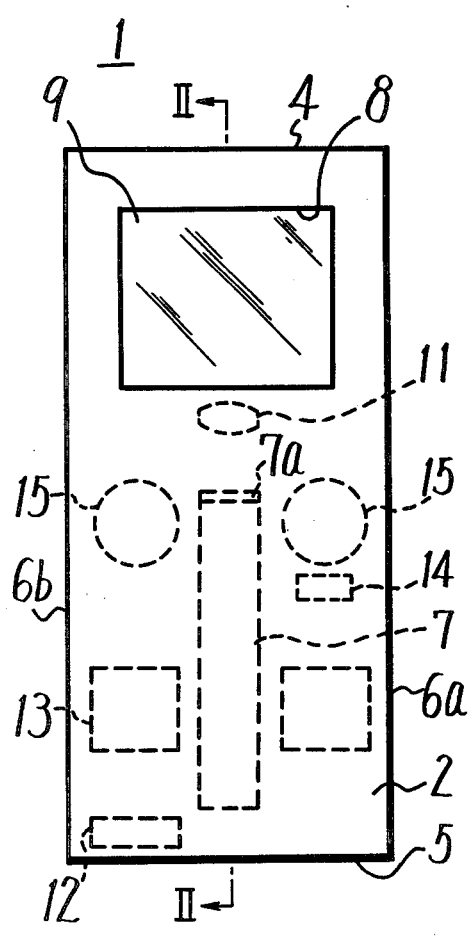
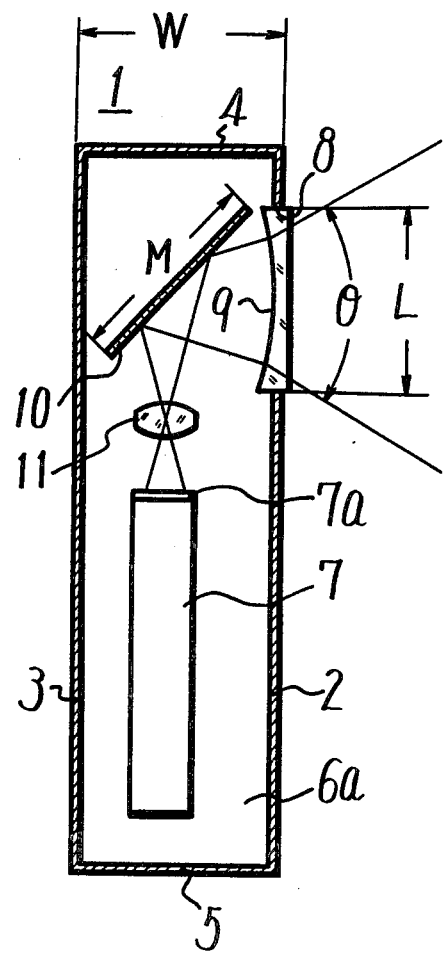

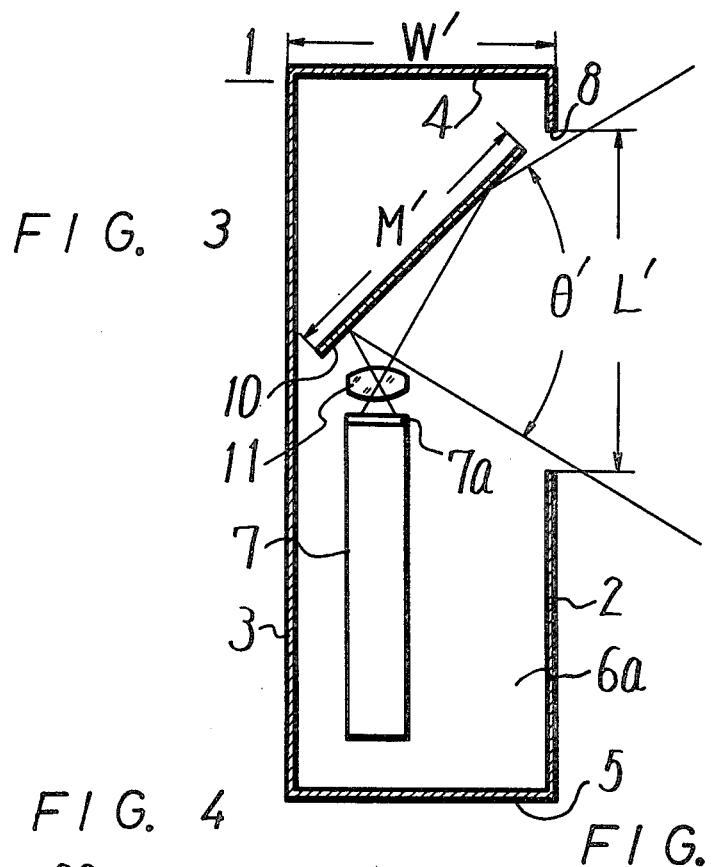
FIG. 3
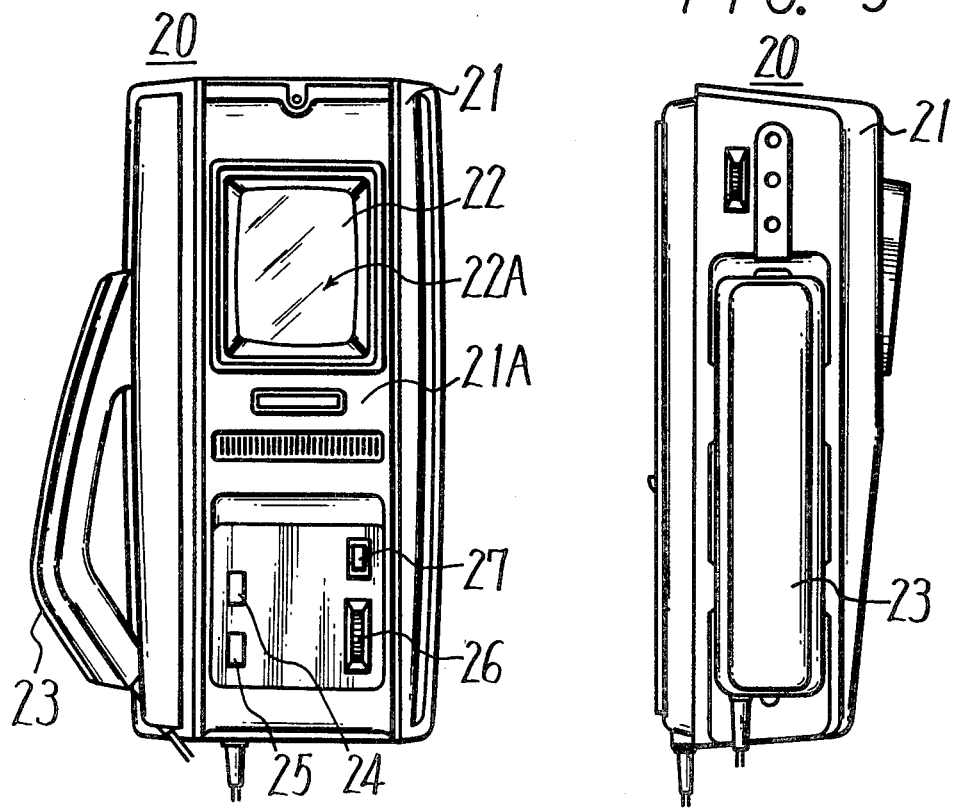
FIG. 4
FIG. 5

REMOTE STATION

BACKGROUND OF THE INVENTION

1. Field of the Invention

The present invention relates generally to a remote station for use with a master station of an interphone system and is directed more particularly to a remote station for use with a master station of an interphone system in which an adaptor lens such as a wide angle lens is provided in front of a pick-up tube of a television camera so as to pick up an object in wide angle.

2. Description of the Prior Art

In general, an interphone system includes a master station and one or more remote stations connected to the master station, and an inter-communication or conversation is possible between the master and remote stations. When the remote station of the interphone system is installed near the entrance or the like of a house, the interphone system is generally called as a door-phone system. In such a case, the interphone or door-phone system is used to know the coming of a visitor to a person in the house and also to ascertain who is the visitor.

By the way, almost all interphone systems which are widely used at present are only for conversation between the remote and master stations thereof, and a visitor is ascertained by the person in the house through the conversation only. If it is possible to ascertain the visitor by his face and figure in addition to his voice, it is further desirable.

To this end, in the art a television camera is provided at the entrance or gate of a house separate from an interphone system and the video signal therefrom is received by an ordinary television receiver or the like located in the house. However, in such a case, the existence of the television camera is easily known to the visitor, which is not preferred generally.

OBJECTS AND SUMMARY OF THE INVENTION

Accordingly, an object of the present invention is to provide a novel remote station for use with a master station of an interphone system.

Another object of the invention is to provide a remote station for use with a master station of an interphone system in which a television camera is incorporated in the remote station.

A further object of the invention is to provide a remote station for use with a master station of an interphone system which includes in its housing a television camera compact in size and good in appearance and an adaptor lens to pick up an object at a wide solid angle.

According to an aspect of the present invention, there is provided a remote station provided with a television camera and coupled to master station of an inter communication system comprising;

(a) a housing of a remote station, said housing including at least front panel;
(b) a window formed through said front panel;
(c) an adaptor lens engaged with said window for introducing light from an object at a wide angle into said housing;
(d) a pick-up tube of a television camera disposed within said housing; and
(e) a reflector disposed within said housing between said adaptor lens and said pick-up tube so as to reflect the light from said object thereon and project thus reflected light on said pick-up tube.

The other objects, features and advantages of the present invention will become apparent from the following description taken in conjunction with the accompanying drawings.

BRIEF DESCRIPTION OF THE DRAWINGS

FIG. 1 is a front view showing an example of the remote station for use with a master station of an interphone system according to the present invention;

FIG. 2 is a cross-sectional view on the line II—II in FIG. 1;

FIG. 3 is a cross-sectional view of a remote station of an interphone system which is used to explain the advantage of the present invention;

FIG. 4 is a front view of a master station to which the remote station of the invention is coupled; and FIG. 5 is its side view.

DESCRIPTION OF THE PREFERRED EMBODIMENT

The present invention will be hereinafter described with reference to the attached drawings.

Turning to FIGS. 1 and 2, an example of the remote station for use with a master station of an interphone system according to the present invention which may be installed at a desired position, for example, the entrance of a house, will be described. In the figures, 1 generally designates a housing of the remote station made of, for example, plastics, aluminum or the like which consists of a front plate or panel 2, a back plate 3, an upper plate 4, a lower plate 5, a right side plate 6a and a left side plate 6b.

Within the housing 1, located is a television camera whose pick-up tube 7 is made to be of, for eaxmple, a rod-shape. In this case, as shown in FIGS. 1 and 2, the longitudinal axis of the rod-shape pick-up tube 7 is arranged in parallel to the surface of the front panel 2 or back plate 3 (or both side plates 6a and 6b) in the vertical direction.

In the example of the invention shown in FIGS. 1 and 2, the pick-up tube 7 of the television camera is so disposed that its target screen or light receiving screen 7a is positioned upwards or the pick-up tube 7 of the rod-shaped is located to be extended in the vertical direction with its target screen 7a upwards.

A window 8 is formed through the front panel 2 of the housing 1 near its upper portion or at the position above the target screen 7a of the pick-up tube 7, and an adaptor lens such as concave lens 9 for widening its visual field which may be formed of more than one lens, is engaged to the window 8. A reflector such as a mirror 10 is located within the housing 1 in front of the window 8 or lens 9, and a standard or master lens 11 is located in the light path between the mirror 10 and the target screen 7a of the pick-up tube 7. Thus, the light incident on the mirror 10 from the outside of the housing 1 through the concave lens 9 is reflected on the mirror 10 and focussed on the target screen 7a of the pick-up tube 7 through the master lens 11. That is, an object such as a visitor (not shown in the figures), who stands, for example, in front of the window 8 or concave lens 9, is picked up by the pick-up tube 7 of television camera through the optical system including the concave lens 9, mirror 10, master lens 11 and so on. The video signal of the object from the television camera is transmitted through a cable to a television receiver provided in a master station described later and reproduced thereon as an image of the object of visitor. Thus, the object or visitor is watched by a person near the master station or the television receiver provided therein.

As shown by the broken lines in FIG. 1, a well known interphone system including a microphone 12, a speaker 13, a call button 14 and so on necessary for the interphone system is provided, which is connected to those provided in the master station described later. Thus, when a visitor operates the call button 14 of the remote station, he can of course communicate with a person in the house or near the master station through the interphone equipments. At this time, it is possible that the television camera is automatically made ON when the visitor pushes the call button 14 or the person in the house operates the monitor button of the master station to make the television camera ON. Then, the television camera supplies the video signal of the visitor in front of the window 8 to the television or monitor receiver installed in the master station so that the person in the house can watch or monitor the image of the visitor on the screen of the television receiver in addition to the conversation with the visitor, if desired.

According to the interphone system, in general, a visitor converses in a closed approximation to the remote station. Therefore, if the pick-up tube 7 is accommodated in the housing 1 of the remote station, the master lens 11 located in front of the target screen 7a of the pick-up tube 7 must be a so-called wide angle lens with a short focal length to pick up a wide angle of an object as shown in FIG. 3. With the arrangement shown in FIG. 3, if the pick-up angle same as that of the invention shown in FIGS. 1 and 2 ($\theta' = \theta$) is required, since in the case of FIG. 3 the master lens 11 is the wide angle lens, it is necessary that the mirror 10 must be a large size one and also the window 8 must be large in size corresponding thereto. Thus, the depth W' of the housing 1 must be large. Further, the employment of the wide angle lens as the master lens 11 makes the cost of whole the apparatus high.

On the contrary, according to the present invention shown in FIGS. 1 and 2, the wide angle adaptor lens such as a concave lens 9 is engaged with the window 8. Therefore, a so-called standard lens can be used as the master lens 11, so that the mirror 10 small in size as compared with that of FIG. 3 can be used and hence the depth W of the housing 1 can be made small. In connection with the small size of the mirror 10, the size of the window 8 formed through the front panel 2 of the housing 1 can be selected small sufficiently. Now, it be assumed that in the example of the invention shown in FIGS. 1 and 2 the depth of the housing 1 is taken as W, the length of the mirror 10 as M, and the height of the window 8 as L, and those of the example shown in FIG. 3 as W', M' and L', respectively. Under such an assumption, the following conditions are respectively established.

$$W < W', M < M' \text{ and } L < L'$$

Therefore, according to the invention the remote station can be made rather small in whole size and a large size window 8 is not required, so that the appearance of the remote station is prevented from deteriorated.

In addition, according to the invention no expensive wide angle lens is employed, so that even though the concave lens 9 and standard lens 11 are used, their price is much low as compared with the case where a wide angle lens is used as the master lens.

Now, an example of the master station, which is installed in the house and to which the remote station of this invention is connected as set forth above, will be briefly described with reference to FIGS. 4 and 5. In the figures, reference numeral 20 designates the master station generally. The master station 20 includes in its housing 21 a monitor television receiver 22 whose picture screen 22A can be seen from the outside of the housing 21. In the figures, 23 designates a handset for communicating with the visitor. Through a front panel 21A of the housing 21, protruded are a monitor button 24, a free lock button 25, a brightness adjusting knob 26 for the monitor television receiver 22, and an exchange button or switch 27 of day and night. Since the master station 20 has no direct relation to the present invention, it will be described simply. When the monitor button 24 is pressed down, the picture picked up by the television camera in the remote station is reproduced on the picture screen 22A of the monitor television receiver 22. The brightness of the picture screen 22A can be adjusted by operating the knob 26. And, if the button 27 is changed over, the lamp 15 in the remote station is changed over for illuminating an object to be picked up by the television camera with proper state.

As described above, according to the present invention, the television camera or its pick-up tube 7 can be disposed in the housing 1 of the remote station without increasing its depth W or in the housing of an ordinary door-phone without varying the size thereof.

In the example of the invention shown in FIGS. 1 and 2, the pick-up tube 7 is positioned in the vertical direction and hence the housing 1 is installed long in the vertical direction. It is, of course, possible that the pick-up tube 7 is positioned in the horizontal direction and hence the housing 1 is installed long in the horizontal direction.

Further, it may be of course possible that the mirror 10 is replaced by a prism or the like with the same effect.

Although the above description is given on a single preferred embodiment of the present invention, it will be apparent that many modifications and variations could be effected by one skilled in the art without departing from the spirits or scope of the novel concepts of the invention.

We claim as our invention:

1. A remote station provided with a television camera and coupled to master station of an inter communication system comprising;
   (a) a housing of a remote station, said housing including at a least front panel;
   (b) a window formed through said front panel;
   (c) an adaptor lens engaged with said window for introducing light from an object at a wide angle into said housing;
   (d) a pick-up tube of a television camera disposed within said housing; and
   (e) a reflector disposed within said housing between said adaptor lens and said pick-up tube so as to reflect the light from said object thereon and project thus reflected light on said pick-up tube.
2. A remote station as claimed in claim 1, in which said adaptor lens is a concave lens.
3. A remote station as claimed in claim 1, in which said reflector is a prism.
4. A remote station as claimed in claim 1 further comprising a master lens between said reflector and said pick-up tube.
5. A remote station as claimed in claim 1 further comprising a light source in said housing for irradiating said object.

* * * * *

UNITED STATES PATENT AND TRADEMARK OFFICE
CERTIFICATE OF CORRECTION

PATENT NO. : 4,355,329
DATED : October 19, 1982
INVENTOR(S) : SHINICHI YOSHIDA ET AL It is certified that error appears in the above--identified patent and that said Letters Patent are hereby corrected as shown below:

On the cover sheet item [73] the name of the assignee should read --NIPPON INTERPHONE CO., LTD., and TOKYO ELECTRONIC INDUSTRY CO., LTD., both of TOKYO, JAPAN--

Signed and Sealed this

Nineteenth Day of April 1983

[SEAL]

Attest:

GERALD J. MOSSINGHOFF

Attesting Officer

Commissioner of Patents and Trademarks